3,213,155
MONOOLEFIN ISOMERIZATION PROCESS
Alan Schriesheim, Berkeley Heights, N.J., and Charles A. Rowe, Jr., Brooklyn, N.Y., assignors to Esso Research and Engineering Company, a corporation of Delaware
No Drawing. Filed May 19, 1961, Ser. No. 111,172
6 Claims. (Cl. 260—683.2)

The instant invention relates to organic conversion reactions and solvent systems for facilitating such reactions. More specifically, the instant invention teaches the utilization of a unique base-solvent system for carrying out a variety of chemical conversion reactions which proceed by the carbanion mechanism.

Carbanion reactions are well known in the art and have been employed in a variety of chemical conversions. These reactions proceed via the formation of a carbanion intermediate, i.e. a negatively charged carbon ion. Conventionally, strong basic catalysts are employed, such as the Group I metals, especially the alkali metals, such as sodium and potassium. (See U.S. Patent 2,952,719.) In order to facilitate these reactions, ether-type solvents, such as tetrahydrofuran, have been used. The use of solvents to enhance the reactivity of reactions is well known. See, for example, Lohse, Catalytic Chemistry, Chemical Publishing Company, Inc., New York, 1945, pages 75–76.

Despite the advances made in solvent and catalytic technology, many reactions have not achieved commercial acceptance because of the rigorous conditions necessary to stabilize the carbanion. With some reactants, the stabilization of carbanions has been, for all practical purposes, impossible.

In accordance with this invention, it has been found that by using particular solvent-base systems, it is possible to perform a variety of chemical reactions which proceed by the carbanion mechanism, which were hitherto of such poor reaction rates as to be commercially unacceptable. More specifically, it has been found that carbanion reactions involving weakly ionizable C—H bonds may be carried out.

The particular solvent employed is of critical import. These solvents may be defined as having the following characteristics: (1) aprotic, that is, they must neither donate nor readily accept a proton; (2) a high dielectric constant, $\epsilon$, in excess of 15 at 25° C.; (3) dipolar; and (4) nonhydroxylic. Of course, the solvents employed in the instant invention must be base stable, i.e. resistant to decomposition in the presence of the base and reactants.

These solvents include organic compounds having the following dipolar groups: (1) a carbonyl, a divalent CO radical; (2) phosphoryl, a trivalent PO radical; (3) sulfinyl or sulfoxide, the divalent SO radical; (4) the sulfonyl or sulfone, the bivalent $SO_2$ radical; (5) and thiocarbonyl, the divalent CS radical. Solvents which meet these criteria are dipolar compounds such as alkyl sulfoxides such as dimethyl sulfoxide and diisopropyl sulfoxide; thiophenes such as tetrahydro thiophene-1,1 dioxide; alkyl formamide such as N,N-dimethyl formamide; alkyl phosphoramides such as trimethyl phosphoramide; and thioureas such as N,N'-dimethyl thiourea.

The base employed may be any of a wide variety of materials. The only limitation on this material is that it must have sufficient basicity to permit the reactions to proceed. Examples of suitable bases include metal hydrides, such as sodium hydrides; metal inorganic amides, such as sodium amide, alkali and alkaline earth organic amides, such as sodium methyl amide; metal alkoxides, such as sodium methoxide and potassium t-butoxide; metal hydroxides, such as sodium hydroxide and cesium hydroxide; and metal alkyls, such as sodium ethyl or butyl lithium. Particularly preferred are bases composed of the heavy alkali metals, e.g. potassium, cesium and rubidium. Furthermore, where the base has an alkyl group, effectiveness is increased by increasing the number of carbon atoms. For example, $KOC_2H_5$ is more effective than $KOCH_3$ and KO t-butylate is more effective than both. This listing is by way of illustration only. Clearly, other suitable bases are known to those skilled in the art. The particular conversion reactions contemplated include a variety of known reactions.

The particular conversion reactions contemplated include a wide variety of known reactions. Broadly, almost any organic compound can be reacted which has an acidic hydrogen attached to a carbon atom which may be removed to form the carbanion intermediate. In addition, since these solvents facilitate ionic reactions, any reaction involving organo-metallic compounds will be enhanced. The following list will include the major reactions:

(1) The polymerization of olefins, diolefins, and vinyl-type compounds,
(2) Aldol and Cannizzaro condensations and the condensation of malonic esters and Michael type addition reactions,
(3) Side chain alkylations of aromatics with olefins and ketones with organic halides,
(4) Olefin double bond and skeletal isomerization,
(5a) Carboxylation of alkyl aromatics, such as toluene, to produce phenylacetic acid,
(5b) Carboxylation of olefins, such as propylene, to yield acrylic acid,
(6) Carbonylation of alkyl aromatics, olefins, etc., with carbon monoxide to yield aldehydes,
(7) Carbene generation from halogen substituted compounds, ethers, sulfides, ammonia salts, etc., and the addition of the generated carbenes to olefins, diolefins and aromatics,
(8) Homogeneous hydrogenation of olefins, diolefins, and aromatics,
(9) Hydroboration of olefins and diolefins,
(10) Formation of vinyl ethers by reaction of alkynes and alcohols,
(11) Benzyne formation reactions using any of known benzyne precursors and reaction of benzyne,
(12) Mercaptan oxidation to disulfides and sulfonic acid,
(13) Silene generation and reactions thereof.

The reaction phase may be either homogeneous or heterogeneous again depending upon the particular system and reaction. Where the base is soluble in the solvent, such as various alkoxides (potassium t-butoxide), then the reaction is homogeneous in base and, if desired, may be homogeneous in hydrocarbon. Practically, the isomerization reaction could be operated heterogeneously where the olefins are separated by a simple mixer-settler operation. Certain bases, such as potassium hydroxide and sodium hydroxide, are insoluble and here a fixed bed might be used with the hydrocarbon and solvent contacting the solid base. These considerations would hold true for reactions involving only hydrocarbons, such as isomerization, polymerization and aldolization.

Obviously, when a gas is present, such as oxygen, carbon monoxide, or carbon dioxide, the above considerations will hold; but the reaction zone will also contain another gaseous phase.

The particular ratios of solvent to base and base to reactant are dependent on a variety of factors. For example, in homogeneous systems, it is desirable to have at least 10 weight percent of base dissolved in the solvent up to saturation. It is preferable that from 20 to 40 weight percent of the solvent-base system be composed of base. In heterogeneous base-solvent systems, the base is practically insoluble. However, the amount of solvent present must be sufficient to ensure wetting the surface of the base. More solvent may be used if it is desirable to dissolve the feed. In the case of olefin polymerization, small amounts of base may be employed, the amount of base being determined by the particular molecular weight desired for the product polymer. That lower base concentrations result in higher molecular weight polymers is well known in the art, as is the amount of base that should be employed for a particular molecular weight range.

The ratio of the amount of base to the reactants is also dependent on a variety of factors, such as the particular base solvent and reaction contemplated. However, this ratio should be adjusted so as to permit the reaction to run at a rate of at least .1 w./hr./w. This selection of variables can be readily determined by one skilled in the art.

In carrying out the reactions disclosed herein, temperatures from 15 to 400° C. may be used, most preferably, from 20 to 150° C. As would be expected, the higher temperatures accelerate the reaction; however, excessively high temperatures may be detrimental to the solvent-base system and the selectivity of the reactions.

Another advantage of the instant base-solvent systems is that in isomerization high stereo-selectivity to the cis isomer is obtained. This is particularly true where a small alkyl group is attached to the carbon atom adjacent to the double bond. As the length of the alkyl group increases, selectivity decreases. For example, a t-butyl group reduces the stereo-selectivity of the isomerization reaction 20 times as compared to a methyl group.

EXAMPLE 1

Isomerization of 2-methylpentene-1 by using the base-solvent system of the instant invention is shown in the example. In carrying out the invention, the base was first dissolved in the solvent so as to yield a concentration shown in the table below. The olefin was then introduced into the base-solvent system and mechanically stirred. The weight percent indicated in the table of 2-methylpentene-2 formed is the amount of conversion after 24 hours. All of the potassium t-butoxide and sodium amide dissolved in the solution. However, all of the potassium hydroxide did not dissolve.

Table 1
ISOMERIZATION OF 2-METHYLPENTENE-1
[Temp.=55° C. Solvent=dimethylsulfoxide]

| Base | Conc. | Ratio: Olefin/Base-Solvent, cc. | Percent Wt.[2] 2-methylpentene-2 |
|---|---|---|---|
| KOH [1] | 30 g | 150/150 | 12.3 |
| K t-butoxide | 0.65 N | 200/100 | 22.6 |
| NaNH$_2$ | 3.2 N | 150/150 | 20.3 |

[1] All KOH did not dissolve.
[2] Percent conversion @ 24 hours, initial wt. percent 2-methylpentene-2 is zero.

As will be noted, yields over 20 weight percent of 2-methylpentene-2 were obtained at the end of the 24 hour period, the efficacy of the conversion being related to the strength of the base employed.

EXAMPLE 2

In a manner similar to that taught in Example 1, 2-methylpentene-1 was contacted with various base-solvent systems. Table II shows the proportion of the reactant and the solvent-base system and the rate of olefin conversion obtained.

Table II
ISOMERIZATION
[55° C. atmos. pressure]

| | | | | | |
|---|---|---|---|---|---|
| Olefin, cc.: | | | | | |
| 2-methylpentene-1 | 10 | 10 | 10 | 20 | 20 |
| Solvent, cc. (ε 25° C.): | | | | | |
| Dimethyl sulfoxide (44) | 100 | 100 | 100 | | |
| Tetrahydrofuran (3) | | | | 200 | |
| t-Butyl alcohol (8) | | | | | 200 |
| Base (moles in solvent): | | | | | |
| Na-t-butoxide | | | 0.4 | | |
| K-t-butoxide | | 0.4 | | 1.0 | 1.0 |
| Cs-t-butoxide | 0.4 | | | | |
| Rate Olefin Conversion ($K_{min}^{-1}$) | 5×10$^{-2}$ | 0.5×10$^{-2}$ | 1.7×10$^{-5}$ | ~0 | ~0 |

The above data clearly show the superiority of the solvents defined by the instant invention, i.e. dimethyl sulfoxide over tetrahydrofuran and t-butyl alcohol, solvents conventionally used in the prior art. In essence, no conversion was obtained with these conventional solvents. It should further be noted that the rate of olefin conversion correlates closely with the alkali metal forming the base. The rate of conversion increases notably with the increase in molecular weight of the alkali metal. For example, the cesium t-butoxide conversion rate is ten times more reactive than that with the potassium t-butoxide and nearly three hundred times faster than the sodium t-butoxide.

EXAMPLE 3

To show the stereo-selectivity of the solvent-base systems of this invention, 20 cc. of butene-1 were isomerized in 200 cc. of dimethyl sulfoxide and 1 mole of K-t-butoxide. 80% conversion to butene-2 was obtained, 76% cis-butene-2 and 4% trans-butene-2.

EXAMPLE 4

To show that a wide variety of olefins can be isomerized in accordance with the instant invention, 20 cc. of various olefins were isomerized at 55° C. The system used was 1 mole of K-t-butoxide dissolved in 200 cc. of dimethyl sulfoxide. In all cases, 100% yields of isomerized product were obtained with no side reactions. The reaction rate and the products formed are shown in the table below.

Table III

| Olefin | Product | Rate Constant k, Min.$^{-1}$ ×10$^3$ |
|---|---|---|
| C—C=C (phenyl) | cis & t (phenyl) C=C—C | 12,000 |
| C=C—C—C | cis & t C—C=C—C | 120 |
| C=C—C—C—C | cis & t C—C=C—C—C | 50 |
| C=C—C—C—C—C | cis & t C—C=C—C—C—C ; cis & t C—C—C=C—C—C | 48 |
| C=C—C—C—C with C branch | C—C=C—C—C with C branch | 33 |
| C=C—C—C—C with C branch | cis & t C—C=C—C—C with C branch | 3 |
| C=C—C—C—C with two C branches | C—C=C—C—C with two C branches | 0.1 |

EXAMPLE 5

One tenth of a mole of the n-butyl mercaptan was oxidized in 100 cc. of methanol, tetrahydrofuran, dioxane, diglyme, N,N-dimethylformamide, and dimethyl acetamide at 23.5±0.2° C. under a constant oxygen pressure of one atmosphere. Two tenths of a mole of sodium methoxide was used in each run, giving a 2:1 mole ratio of base to mercaptan. Each oxidation was carried out to about 40 to 50% completion. The amount of mercaptan converted to the disulfide at any given time was determined by the amount of oxygen consumed since it was determined experimentally that the stoichiometry for disulfide formation involves a 4:1 mole ratio of mercaptan to oxygen.

The first order rate constants for the oxidation of n-butyl mercaptan to the disulfide in each solvent along with the rates relative to that in methanol appear in Table IV.

*Table IV*

OXIDATION OF n-BUTYL MERCAPTAN IN NONHYDROXYLIC SOLVENTS

| Solvent | $k \times 10^3$, Min.$^{-1}$ | k Relative to Methanol |
|---|---|---|
| Methanol | 3.22 | 1 |
| Tetrahydrofuran | 116 | 36 |
| Dioxane | 989 | 90 |
| Diglyme | 323 | 100 |
| Dimethyl Acetamide | 936 | 291 |
| N,N-dimethyl formamide | 1,077 | 334 |

The results show that the solvents of the instant invention increase the rate of oxidation some 300 times faster than methanol and from about 3 to 9 times the rate of etheral solvents.

What is claimed is:

1. The method for effecting the isomerization of monoolefinic hydrocarbon compounds in a carbanion reaction process which comprises contacting said unsaturated hydrocarbon compound with a base-solvent system consisting essentially of a basic catalyst selected from the group consisting of alkali metal alkoxides and alkali metal amides and an aprotic, dipolar organic solvent which is selected from the group consisting of dimethylsulfoxide, N,N-dimethyl formamide, and dimethyl acetamide in an amount and for a period sufficient to effect a shift in the position of the double bond in the said unsaturated hydrocarbons.

2. The method of claim 1 wherein the unsaturated hydrocarbon is an alpha-olefin.

3. The method of calim 1 wherein the alkali metal alkoxide is potassium-t-butoxide.

4. The method of claim 1 wherein the alkali metal alkoxide is sodium-t-butoxide.

5. The method of claim 1 wherein the alkali metal alkoxide in cesium-t-butoxide.

6. The method of claim 1 wherein the alkali metal alkoxide is sodium methoxide.

References Cited by the Examiner

UNITED STATES PATENTS 3,053,916   9/62   Wilson et al. _____ 260—683.15
3,097,195   7/63   Kennerly et al. ____ 260—683.15 X

OTHER REFERENCES

Cram et al.: J.A.C.S., vol. 81 (Nov. 5, 1959), pages 5774–5784 and 5835.

Cram et al.: J.A.C.S., vol. 82 (Dec. 20, 1960), pages 6412–6413.

Price et al.: J.A.C.S., vol. 83 (Apr. 5, 1961).

Emmett: "Catalysis," volume VI, page 44, published by Reinhold Publishing Company, New York (1958).

References Cited by the Applicant

"Mechanism and Structure in Organic Chemistry," by Edwin S. Gould; Holt, Rinehart and Winston, Inc., New York, 1959, pages 365 et seq.

ALPHONSO D. SULLIVAN, *Primary Examiner.*

PAUL M. COUGHLAN, *Examiner.*